Figure 1:
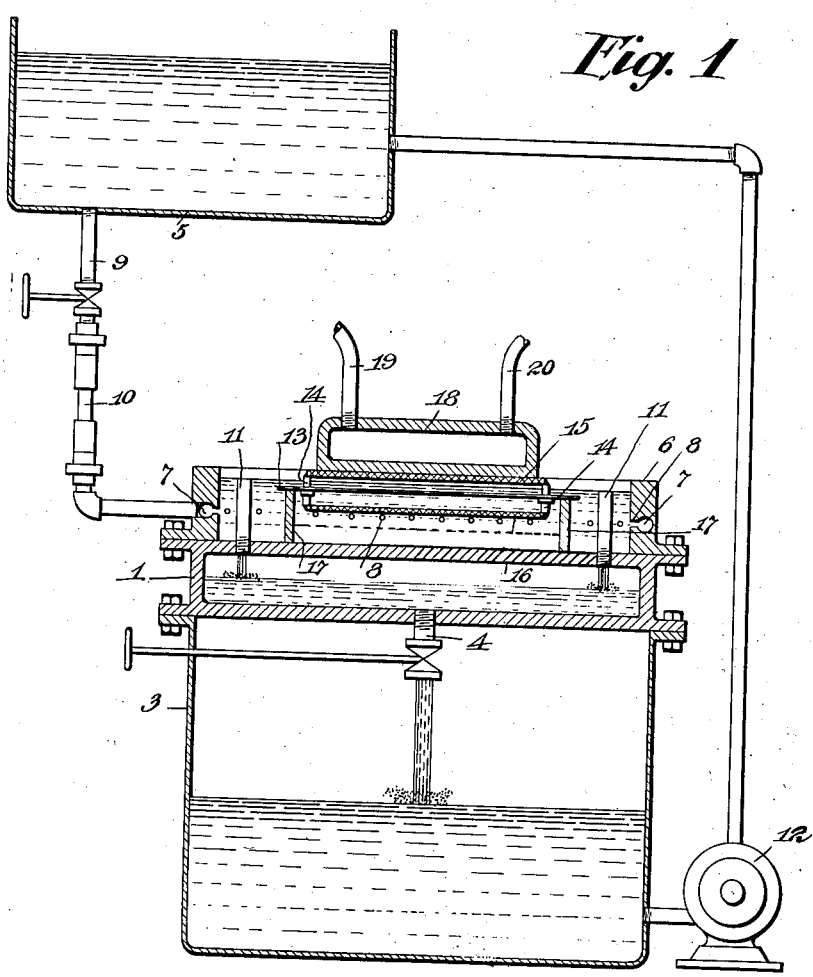

March 9, 1926.

W. G. ALLAN 1,575,609

METHOD OF AND APPARATUS FOR UNITING METALLIC BODIES

Original Filed Nov. 10, 1923

William G. Allan
INVENTOR.

BY Dyer Taylor
ATTORNEYS.

Patented Mar. 9, 1926.

1,575,609

UNITED STATES PATENT OFFICE.

WILLIAM G. ALLAN, OF TORONTO, ONTARIO, CANADA, ASSIGNOR TO JOHN P. SCOTT, OF TORONTO, ONTARIO, CANADA.

METHOD OF AND APPARATUS FOR UNITING METALLIC BODIES.

Application filed November 10, 1923, Serial No. 674,047. Renewed August 12, 1925.

*To all whom it may concern:*

Be it known that I, WILLIAM G. ALLAN, a subject of the King of Great Britain, and a resident of Toronto, county of York, Province of Ontario, Dominion of Canada, have invented a certain new and useful Method of and Apparatus for Uniting Metallic Bodies, of which the following is a specification.

The invention relates to methods of uniting one metallic body at or near its edges to another metallic body, the said bodies being parallel, and more particularly to the welding of a relatively distortable or flexible body in spaced and parallel relation to another and more rigid body, and at a plurality of points at or near the edge or edges of the relatively flexible body, and to an apparatus in which the method may be carried out.

One object of the invention is to provide a method of uniting metallic bodies whereby in one, at least, of said bodies the strains set up in the process of uniting them are utilized to eliminate any tendency to sagging or buckling of said body.

Another object is to provide a method of uniting one metallic body to another, in which one of said bodies will be in a state of tension after the operation.

Another object is to provide a method of uniting one metallic body to another while one of said bodies is expanded relatively to the other during the uniting operation.

A further object is to provide a method of uniting one metallic body to another, in which said bodies are maintained at different temperatures during the uniting operation.

A still further object is to provide a method of uniting one metallic body to another, in which one of said bodies is raised to a higher temperature than the other during the uniting operation, and to balance the strains due to the possession of inherent differences in coefficients of expansion of the heated body, or any part thereof as compared with the cooler body, during the cooling of the heated body.

A further object is to provide a method whereby after the uniting operation the temperature of one of said bodies is lowered and the temperature of the other is raised until a temperature of equilibrium is reached, and reducing the temperatures of both bodies together.

Still another object is to produce an apparatus in which the method is carried out, which will be cheap to construct, easy to operate, which will not easily get out of order, which will be automatic in operation, and which will operate at a minimum of power.

These and further objects will more fully appear in the following specification and accompanying drawings considered together or separately.

Figure 2:
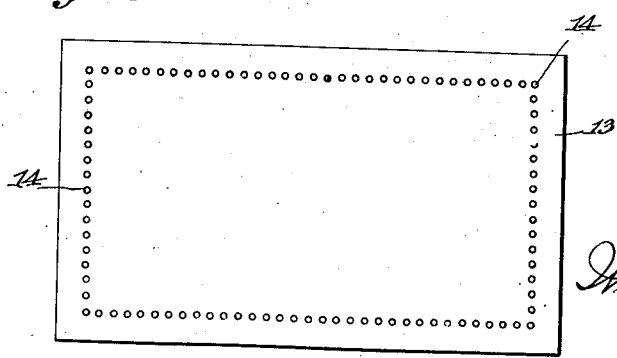

One embodiment of the invention is illustrated in the accompanying drawings, in which like parts are designated by corresponding characters of reference, and in which Fig. 1 is sectional view of the preferred form of apparatus for carrying out the method of the invention, and Fig. 2 is a plan of one of the bodies to be united.

The drawings illustrate the method of the present invention as utilized in welding the foraminous electrodes illustrated in applicant's copending application for patent entitled Electrode structure and method of manufacturing same, filed September 2, 1920, Serial Number 407,637, to the studs or projections of the supporting or backing plate of the electrode structure.

The present invention is not, however, limited to such use. The method may be employed in the forming of structures other than electrodes. The distortable body need not be a sheet, or a plurality of superposed sheets, of wire fabric. The said body need not be welded to a rectangular series of studs. The said body need not be welded at spaced intervals around its periphery. The said body need not be foraminous. The said bodies need not be welded together, but may be soldered, brazed or otherwise secured together.

In carrying out the embodiment of the invention illustrated in the drawings a platform 1, on the upper surface of which the bodies to be united, are supported, is provided. The platform is of hollow construction to provide a chamber 2, and may be supported on the top of a tank 3, there being a valved outlet pipe 4 in the bottom of the chamber.

A water supply tank 5 is supported above the platform 1, and a rim 6 surrounds the outer edge of the platform. The rim is provided with an endless conduit 7, and said conduit communicates with the reservoir enclosed by the rim 6, by means of a series of perforations 8, as shown. A valved pipe 9 having an observation glass section 10 offers communication between the tank 5 and the conduit 7.

The water in the reservoir is maintained at the desired level by means of a plurality of standpipes 11, the open, upper ends of which are at the same distance above the top of the platform 1, which should be machined to be perfectly flat and plane, and should be accurately leveled. The standpipes extend through the top of the platform, and the overflow from the reservoir will flow into the chamber 2 and thence to the storage tank 3.

A pump 12 is adapted to deliver water from the tank 3 to the tank 5, whereby there will be a circulation of water through the apparatus.

To regulate the level of the water in the reservoir longer or shorter pipes 11 may be employed.

In the embodiment of the invention illustrated the structure to be formed is the bipolar electrode structure illustrated in applicant's copending application above identified.

The said structure comprises a foundation or backing plate 13 carrying a plurality of spaced studs 14 in rectangular arrangement. The studs project from both sides of the plate, and the ends of the studs are all the same distance from the face of the plate from which they project.

Carried on the ends of the studs projecting from one side of the plate 13 is an electrode element 15 composed of a plurality of superposed layers or sheets of woven wire fabric cut to rectangular form and with their edges fused or welded down to form a solid frame or border, as in the copending application referred to, with the border resting on the studs.

A similar electrode element 16 is carried on the ends of the stud projecting from the opposite side of the plate 13.

The operation is as follows:—

Water, preferably rendered alkaline by a suitable solute, from the tank 5 is admitted to the reservoir, formed by the rim 6, through the pipe 9, conduit 7 and perforations 8 and overflows through the standpipes 11 into the chamber 2 and thence into the tank 3 whence it is pumped back to the tank 5.

The plate 13, of which the studs 14 form a part is now placed in the water bath in the reservoir and supported, as by means of bars 17, or otherwise, whereby the uppermost studs will project slightly above the surface of the bath.

The electrode member 16 is now placed in position resting on the tops of the studs and slightly above the surface of the water, which latter is at or about room temperature, and the plate and the studs, up to near the point of attachment to the electrode, are maintained at a temperature approximately that of the bath.

A heavy, hollow removable block 18 preferably of cast iron and having its lower surface accurately machined flat and plane, is placed in position on the upper surface of the electrode. The shape of the block is preferably the same as that of the electrode but the dimensions of its plane surface are somewhat less than those of the electrode and of the space bounded by the studs whereby the weight of the block will be supported by the electrode inside of the lines of studs.

The weight is heated to a relatively high temperature as compared to that of the plate 13 and its studs, as, for example, by means of superheated steam entering its hollow chamber by means of a pipe 19 and escaping by means of a pipe 20.

The heat of the block will raise the temperature of the electrode to about 300° to 350° F., and the electrode as a whole will expand. The natural expansion will be largely in the direction longitudinally of the wires of the electrode, and the electrode, as a whole, will expand longitudinally and laterally.

In this expanded condition the frame or border of the element 16 is welded to the studs on which the element is supported. The welding operation may be carried out by any suitable process, preferably by the electric arc, and the order of welding is preferably so arranged that the necessary cooling intervals of time are allowed between the welding of any given stud and that adjacent or near it.

The following order of welding, which has proved suitable and desirable in a given case, need not be considered as absolutely the same in every case, but is given as an illustration.

The studs 14 may be arranged as shown in Fig. 2, and with this arrangement the welding may be carried out, beginning with the element 16, as follows:

The four corner studs, and the center studs on each long side are welded to the element.

The fourth studs from the corners of the two short sides are now welded, and following this every fourth stud down the two long sides. Next every stud, centrally intermediate between the welded fourth studs, is welded. The intermediate and alternate studs are now welded.

In all of the welding operations care should be taken to weld in order, studs which are diagonally remote from one another of opposite sides of the plate.

When the element 16 has been welded to all of the studs on its side of the plate 13, the hot block is removed, and the welded structure is removed from its position on the platform 1, and immersed without delay in a bath of an alkaline solution, the temperature of which is approximately intermediate that of the water in the reservoir and that of the hot block, say, for example, 150° F. The structure should remain in the bath until its temperature is reduced to room temperature.

The structure is again placed in the reservoir with the element 16 submerged. The element 15 is placed on the studs projecting from the now upper side of the plate 13, and the above described order of welding and cooling is repeated.

During the cooling operations the electrode elements will contract, whereby the strands thereof will be under tension, and all warps, waviness and bulging as to the outer face, at least, of the electrode elements will be eliminated. In the process of heating the electrode elements the weight of the hot block will prevent any warping or bulging of the electrode face in contact therewith.

In the building up of a unipolar electrode the foundation plate will have studs projecting from one side only, and there will be but one electrode element welded to place.

The process may be carried out in connection with an electrode element formed of a single sheet of wire gauze, or one formed of a perforated, or an unperforated element of sheet metal, or in the manufacture of structures other than electrodes. It may be carried out in a structure in which one body is united at its entire edge to another body, and not at intervals as above described, and one body may be united directly to another without the intervention of studs or the like between the bodies.

The process may be carried out in any situation where a more or less flexible body is united at or near its edge or edges to a body relatively rigid and non-deformable under the strains and stresses due to the expansion and/or contraction of the flexible body.

In the case of forming a bipolar electrode member where the electrode elements 15 and 16 thereof are of different materials having different coefficients of expansion, in order to prevent the foundation plate from bowing, the order of welding of the supporting and spacing studs to the elements may be varied to suit the case, by reversing the structure several times during the welding whereby one element will be nearly completed when the other is finished, or by using greater differences of working temperatures on different elements, or by a combination of any or all of these.

In carrying out the process, care should be taken that one body, which may be called the base, is of sufficient weight, strength and rigidity that it will not bow or bend under the contracting stresses of the other body.

Any heat absorbed by the water in the reservoir will be radiated from the surface thereof, or through the materials of the rim 6, platform 1, tanks 3 and 5, and the piping whereby the water in the reservoir may be maintained at approximately constant temperature.

Alkaline water is used in the system to prevent corrosion of the materials acted on by the process, and of the apparatus.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described what is claimed as new and desired to be secured by Letters Patent, is—

1. A method of securing one body to another, one of said bodies being superposed over the other, which comprises expanding one body relatively to the other, and uniting the bodies while said body is in its expanded condition.

2. A method of securing one body to another, one of said bodies being superposed over the other, which comprises expanding one body relatively to the other, and uniting the bodies in the vicinity of the edge of one of the bodies while said body is in its expanded condition.

3. A method of securing one body to another, one of said bodies being superposed over the other, which comprises expanding one body relatively to the other, and uniting the bodies at intervals along the edge of one of the bodies while said body is in its expanded condition.

4. A method of securing one body to another, the planes of said bodies being parallel, which comprises maintaining said bodies at different temperatures whereby one body will be expanded relatively to the other, and uniting the edges of one body to the other body.

5. A method of securing one body to another, the planes of said bodies being parallel, which comprises maintaining said bodies at different temperatures whereby one body will be expanded relatively to the other, and uniting the edges of one body at intervals to the other body.

6. A method of securing one body to another, one of said bodies being superposed over the other, which comprises expanding one body relatively to the other, uniting the bodies, and bringing the united bodies to the same temperature.

7. A method of securing one body to another, one of said bodies being superposed over the other, which comprises expanding one body relatively to the other, uniting the bodies in the vicinity of the edge of one of the bodies, and bringing the united bodies to the same temperature.

8. A method of securing one body to another, one of said bodies being superposed over the other, which comprises expanding one body relatively to the other, uniting the bodies at intervals along the edge of one of the bodies, and bringing the united bodies to the same temperature.

9. A method of securing one body to another, the planes of said bodies being parallel, which comprises maintaining said bodies at different temperatures whereby one body will be expanded relatively to the other, uniting the edges of one body to the other body, and cooling the bodies.

10. A method of securing one body to another, the planes of said bodies being parallel, which comprises maintaining said bodies at different temperatures whereby one body will be expanded relatively to the other, uniting the edges of one body at intervals to the other body, and cooling the bodies.

11. A method of securing a readily deformable sheet-like body to a relatively non-deformable body, which comprises heating the first mentioned body relatively to the temperature of the second mentioned body, and securing the first body at its edges to the second body while maintaining the relative temperatures.

12. A method of securing a readily deformable sheet-like body to a relatively non-deformable body, which comprises heating the first mentioned body relatively to the temperature of the second mentioned body, and securing the first body at its edges at intervals to the second body while maintaining the relative temperatures.

13. A method of securing a readily deformable sheet-like body to a relatively non-deformable body, which comprises heating the first mentioned body relatively to the temperature of the second mentioned body, securing the first body at its edges to the second body while maintaining the relative temperatures, and reducing the temperature of the first mentioned body.

14. A method of securing a readily deformable sheet-like body to a relatively non-deformable body, which comprises heating the first mentioned body relatively to the temperature of the second mentioned body, securing the first body at its edges at intervals to the second body while maintaining the relative temperatures, and reducing the temperature of the body of higher temperature.

15. A method of securing one metallic body to another, the plane surfaces of said bodies being parallel, one of said bodies being slight in structure compared with the other, which comprises expanding the slighter body relatively to the stronger by the application of heat to the slighter, and uniting the slighter body at its edges to the heavier body, the united portion being the only point of attachment between the bodies.

16. A method of securing one metallic body to another, the plane surfaces of said bodies being parallel, one of said bodies being slight in structure compared with the other, which comprises expanding the slighter body relatively to the stronger by the application of heat to the slighter, uniting the slighter body at its edges to the heavier body, the united portion being the only point of attachment between the bodies, and cooling the slighter body to the temperature of the heavier.

17. A method of securing one metallic body to another, the plane surfaces of said bodies being parallel, one of said bodies being slight in structure compared with the other, which comprises expanding the slighter body relatively to the stronger by the application of heat to the slighter, uniting the slighter body at its edges to the heavier body, the united portion being the only point of attachment between the bodies, equalizing the temperatures of the bodies, and cooling the bodies together.

18. A method of securing one metallic body to another, the plane surfaces of said bodies being parallel, one of said bodies being slight in structure compared with the other, which comprises expanding the slighter body relatively to the stronger by the application of heat to the slighter, uniting the slighter body at its edges to the heavier body, the united portion being the only point of attachment between the bodies, simultaneously raising the temperature of the heavier body and lowering the temperature of the slighter body until an equilibrium of temperature is reached, and simultaneously lowering the temperatures of both bodies.

19. A method of attaching one metal body to another, one of said bodies being composed of elements extending in different directions, the other body being of solid material, said bodies being of sheet-like form and parallelly arranged and spaced apart by spacing members, which comprises placing the first mentioned body in position with its edges resting on the spacing members, heating the said first mentioned body whereby its elements will be expanded longitudinally while maintaining the solid body and the supports at a relatively low temperature, welding the first mentioned body to the supports, and cooling the said body to the temperature of the solid body.

20. A method of attaching one metal body to another, one of said bodies being composed of elements extending in different directions, the other body being of solid material, said bodies being of sheet-like form and parallelly arranged and spaced apart by spacing members, which comprises placing the first mentioned body in position with its edges resting on the spacing members, heating the said first mentioned body whereby its elements will be expanded longitudinally while maintaining the solid body and the supports at a relatively low temperature, welding the first mentioned body to the supports, immersing the structure in a bath having a temperature approximately midway between the temperatures of the bodies whereby the temperature of one body will be lowered and that of the other will be raised until a balance of temperatures is reached, and reducing the temperatures of both bodies together.

21. A method of securing a deformable metal body to and in parallel relation to a relatively non-deformable body, which comprises placing the last mentioned body in a bath, there being a relatively small portion of said body projecting above the surface of the bath, the liquid of the bath being constantly changing, positioning the deformable body on the projecting portions, heating the deformable body to expand the same, uniting the deformable body while in the expanded state to the projecting portions, lowering the temperature of the heated body and simultaneously raising the temperature of the cooler body until an equilibrium of temperatures is reached, and allowing the bodies to cool together.

22. Apparatus of the character described, comprising a reservoir, means for admitting water to the reservoir, means for limiting the depth of the water in the reservoir, means for supporting a body partly submerged in a cooling medium, there being a second body adapted to be secured to the first mentioned body supported on the first body, and means for heating the second mentioned body to expand the latter relatively to the first mentioned body, whereby when said bodies are secured together and cooled, one body will be under tension.

23. Apparatus of the character described, comprising a hollow platform, a rim surmounting the platform and forming a reservoir with the top of the platform forming the bottom of the reservoir, a water storage tank, connections between the tank and reservoir whereby water may be admitted to the latter at a plurality of points, standpipes extending upward from the bottom of the reservoir and communicating with the chamber in the platform, a receiving tank in communication with the chamber and means for transporting the contents of the latter tank to the storage tank.

This specification signed and witnessed this sixth day of November, 1923.

WILLIAM G. ALLAN.